United States Patent [19]

Gellert

[11] Patent Number: 5,641,526
[45] Date of Patent: Jun. 24, 1997

[54] INJECTION MOLDING NOZZLE MANIFOLD

[76] Inventor: Jobst Ulrich Gellert, 7A Prince Street, Georgetown, Ontario, Canada, L7G 2X1

[21] Appl. No.: 585,519

[22] Filed: Jan. 16, 1996

[30] Foreign Application Priority Data

Dec. 6, 1995 [CA] Canada .................................. 2164557

[51] Int. Cl.$^6$ .................................................. B29C 45/22
[52] U.S. Cl. ...................... 425/549; 264/328.8; 425/570; 425/572; 425/588
[58] Field of Search ....................... 425/549, 570, 425/572, 588; 264/328.8

[56] References Cited

U.S. PATENT DOCUMENTS

| | | | |
|---|---|---|---|
| 4,094,447 | 6/1978 | Gellert | 425/570 |
| 4,921,708 | 5/1990 | Gellert | 425/568 |
| 5,030,084 | 7/1991 | Gellert et al. | 425/549 |
| 5,366,370 | 11/1994 | Gellert | 425/549 |
| 5,551,863 | 9/1996 | Hepler | 425/549 |
| 5,569,475 | 10/1996 | Adas et al. | 425/549 |

*Primary Examiner*—Tim Heitbrink
*Attorney, Agent, or Firm*—Dalesman & Company

[57] ABSTRACT

Hot tip injection molding apparatus having a heated melt distribution manifold for conveying melt to a number of gates. A number of nozzle manifolds are closely mounted to the front surface of the heated manifold. Each nozzle manifold has a number of spaced nozzle portions extending from a rear manifold portion. A melt channel branches from an inlet on the rear surface of the rear manifold portion to an outlet on the conical surface of each nozzle portion. The rear surfaces of the nozzle manifolds are rectangular rather than round to improve the efficiency of heat transfer from the heated manifold to the nozzle manifolds.

5 Claims, 3 Drawing Sheets

5,641,526

INJECTION MOLDING NOZZLE MANIFOLD

BACKGROUND OF THE INVENTION

This invention relates generally to injection molding and more particularly to a nozzle manifold used for multi-gate hot tip molding.

Multi-gate injection molding apparatus is well known in which the melt passage branches in a melt distribution manifold and then each branch extends through a heated nozzle secured to the manifold. As seen in the applicant's U.S. Pat. No. 4,094,447 which issued Jun. 13, 1978, it is also known to provide a heated nozzle in which the melt passage branches outwardly to several edge gates. While this is suitable for edge gating, each of the front portions of the nozzle has a flat face which is not suitable for hot tip gating.

The applicant's U.S. Pat. No. 4,921,708 which issued May 1, 1990 does show a multi-gate application with hot tips provided by four elongated probes mounted around a heated nozzle. Other arrangements of multi-tip nozzles are also well known. However, they all have a generally cylindrical shape with a circular rear surface which limits the surface contact with the adjacent manifold. In a system with a large number of gates, it is usually preferable to reduce overall size by having the gates as close together as possible. On the other hand, it is also desirable to maximize heat transfer from and thus surface contact with the adjacent manifold.

SUMMARY OF THE INVENTION

Accordingly, it is an object of the present invention to provide a nozzle manifold having a plurality of spaced pointed tip nozzle portions extending from a rear manifold portion having a rectangular portion which is secured to an adjacent manifold.

To this end, in one of its aspects, the invention provides a multi hot tip gate injection molding apparatus having a heated melt distribution manifold with a front surface mounted in a mold, the melt distribution manifold having a melt passage branching therein from a common inlet to a plurality of spaced outlets on the front surface of the melt distribution manifold, the improvement wherein a plurality of nozzle manifolds are closely mounted to extend frontwardly from the front surface of the melt distribution manifold, each of the nozzle manifolds having a plurality of spaced nozzle portions extending forwardly from a single rear manifold portion with a rear surface, the rear manifold portion having a rectangular cross-section with the entire rear surface of the rear manifold portion abutting against the front surface of the melt distribution manifold, each nozzle portion having a conical front surface extending to a pointed tip mounted in alignment with an injection gate, each of the nozzle manifolds having a melt channel extending therethrough from an inlet on the rear surface to receive pressurized melt from the melt passage in the melt distribution manifold, the melt channel branching in the rear manifold portion into a plurality of branches, a respective one of the branches extending to an outlet on the conical surface of each of the nozzle portions.

Further objects and advantages of the invention will appear from the following description taken together with the accompanying drawings.

DETAILED DESCRIPTION OF THE INVENTION

Figure 1:
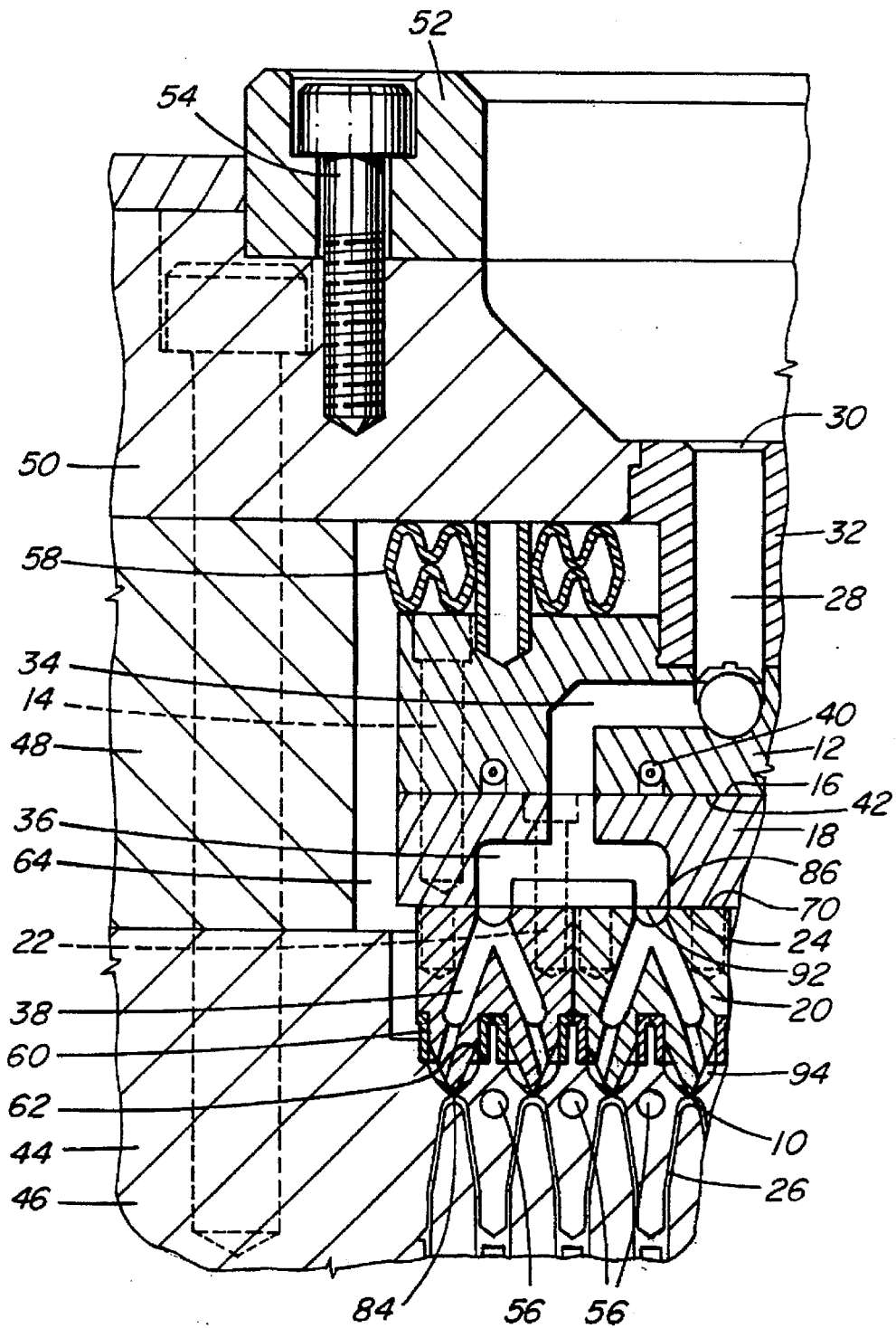
FIG. 1 is a sectional view of a portion of a multi-gate injection molding system or apparatus having a number of nozzle manifolds according to a preferred embodiment of the invention.
Figure 2:
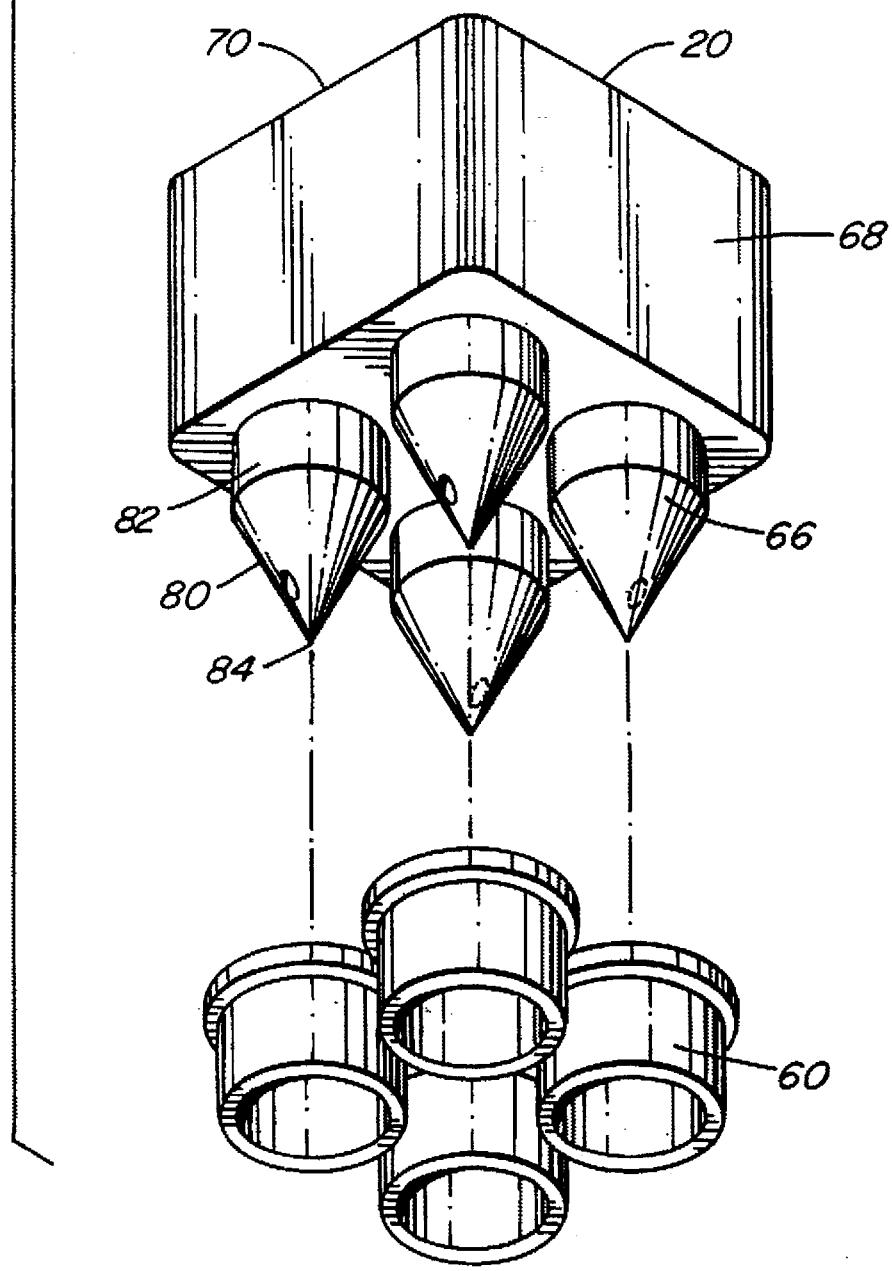
FIG. 2 is an isometric view of one of the nozzle manifolds seen in FIG. 1.

Reference is first made to FIG. 1 which shows a portion of a hot tip gated injection molding system or apparatus having ninety-six gates 10. In this case, a main manifold 12 is secured by screws 14 to the rear surface 16 of a sub-manifold 18 and twenty-four nozzle manifolds 20 according to the invention are in turn secured by screws 22 to the front surface 24 of the sub-manifold 18. However, in other configurations the nozzle manifolds 20 can be secured directly to a manifold without requiring a sub-manifold and thus in this case the sub-manifold 18 can be considered part of the manifold. While the main manifold 12 and the sub-manifolds 18 are made of steel, the nozzle manifolds 20 are made of a more thermally conductive material such as AMCO 940 copper alloy. Pressurized melt is conveyed to each gate 10 leading to a cavity 26 through a melt passage 28 which extends from a central inlet 30 in an inlet portion 32 of the main manifold 12. The melt passage 28 branches into six different branches 34 in the main manifold 12 and each branch 34 branches into four different branches 36 in the sub-manifold 18. Each of these branches 36 extends to a melt channel 38 in one of the nozzle manifolds 20 as described below. The manifolds 12, 18 and the nozzle manifolds 20 are heated by an electrical heating element 40 integrally embedded in the front surface 42 of the main manifold 12 as well as by ambient heat from the melt received from the molding machine and shear heat generated in the pressurized melt being injected during the injection cycle.

While the mold 44 normally has a greater number of plates depending upon the application, in this case only a cavity plate 46, spacer plate 48, and a back plate 50 with a locating ring 52 secured to it by screws 54 are shown for ease of illustration. The cavity 26 in the mold 44 is cooled by pumping cooling water through cooling conduits 56. The manifolds 12, 18 and the nozzle manifold 20 are securely located in place by insulative and resilient spacer members 58 between the main manifold 12 and the back plate 50 and by sealing and locating sleeves 60 which fit around each nozzle portion 66 of each nozzle manifold 20. In this embodiment the sealing and locating sleeves 60 are made of a titanium alloy and each of them is seated in a circular seat 62 in the cavity plate 46. This provides an insulative air space 64 between the heated manifolds 12, 18 and the nozzle manifolds 20 and the surrounding cooled mold 44.

As best seen in FIGS. 2–5, each nozzle manifold 20 has a number of spaced nozzle portions 66 extending frontwardly from a rear manifold portion 68. The rear manifold portion 68 has a rear surface 70 which abuts against the front surface 24 of the sub-manifold 18. The nozzle manifolds 20 are secured in this position by two screws 22 (shown in FIG. 1) extending from the sub-manifold 18 into threaded holes 76 in the rear manifold portions 68 of each nozzle manifold 20. In the embodiment shown, each nozzle manifold 20 has four equally spaced nozzle portions 66 and the rear manifold portion 68 has a square cross-section with one of the nozzle portions 66 extending forwardly from each quadrant 78 of the square rear manifold portion 68. In other embodiments, the nozzle manifolds 20 can have a different number of nozzle portions 66. However, it is critical that the rear manifold portion 68 have a rectangular cross-section to maximize surface contact between its rear surface 70 and the front surface 24 of the sub-manifold 18. The maximum surface contact provided by this rectangular shape ensures maximum heat transfer between the sub-manifold 18 and the closely mounted nozzle manifolds 20.

Figure 3:
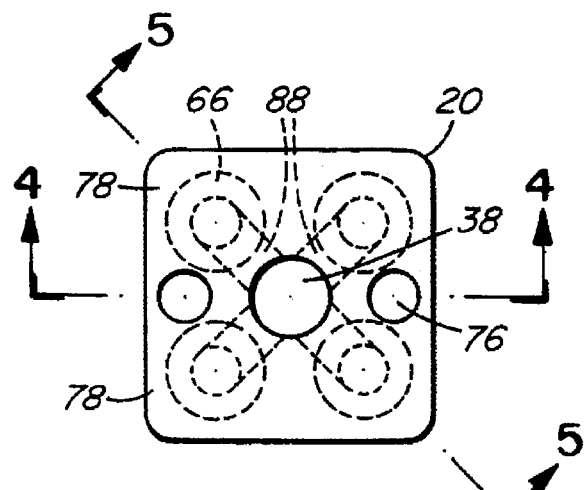
FIG. 3 is a plan view of the nozzle manifold seen in FIG. 2.
Figure 4:
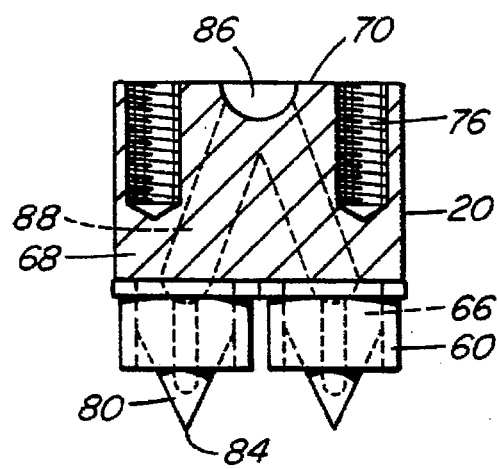
FIG. 4 is a sectional view along line 4—4 in FIG. 3.
Figure 5:
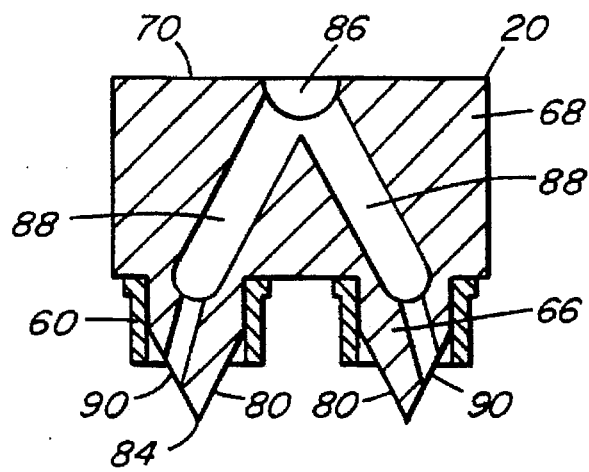
FIG. 5 is a sectional view along line 5—5 in FIG. 3.

Each of the nozzle portions 66 has a conical front surface 80 extending from a cylindrical portion 82 to a pointed tip 84. The cylindrical portion 82 fits in a sealing and locating sleeve 60 which locates the pointed tip 84 in alignment with one of the gates 10. As best seen in FIGS. 3–5, each nozzle manifold 20 has a melt channel 38. The melt channel 38 extends through the nozzle manifold 20 from an inlet 86 on the rear surface 70 and branches diagonally outwardly and forwardly in the rear manifold portion 68 with a branch 88 extending to an outlet 90 on the conical front surface 80 of each of the nozzle portions 66. The inlet 86 to the melt channel 38 in each nozzle manifold 20 is aligned with a respective outlet 92 from the melt passage 28 in the sub-manifold 18.

In use, electrical power is applied to the electrical heating element 40 embedded in the main melt distribution manifold 12 and this heats the main manifold 12, the sub-manifold 18, and each of the attached nozzle manifolds 20 to a predetermined operating temperature. As mentioned above, the rear surface 70 of each nozzle manifold 20 being square rather than round provides maximum efficiency of heat transfer by conduction from the sub-manifold 18 to the closely mounted nozzle manifolds 20. Pressurized melt is supplied from a molding machine (not shown) to the melt passage 28 extending through the main manifold 12 and sub-manifold 18 according to a predetermined injection cycle. The melt from each branch 36 of the melt passage 28 flows through the melt channel 38 in a respective nozzle manifold 20 into a space 94 in the mold 44 around the conical front surface 80 and then through the gate 10 into the cavity 26. As seen in FIG. 1, the sealing and locating sleeves 60 prevent leakage of the melt from this space 94 as well as locate the pointed tip 84 in exact alignment with the respective gate 10. After the cavity 26 is filled and a suitable packing and cooling period has expired, the injection pressure is released and the melt conveying system is decompressed to avoid stringing through the open gate 10. The mold 44 is then opened to eject the molded product. After ejection, the mold 44 is closed and the cycle is repeated continuously with a cycle time dependent upon the size of the cavity or cavities and the type of material being molded.

While the description of the injection molding nozzle manifold 20 has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In a multi hot tip gate injection molding apparatus having a heated melt distribution manifold with a front surface mounted in a mold, the melt distribution manifold having a melt passage branching therein from a common inlet to a plurality of spaced outlets on the front surface of the melt distribution manifold, the improvement wherein;

a plurality of single piece nozzle manifolds are closely mounted to extend frontwardly from the front surface of the melt distribution manifold, each of the single piece nozzle manifolds formed by a plurality of spaced nozzle portions extending forwardly from a single rear manifold portion with a rear surface, the rear manifold portion having a rectangular cross-section with the entire rear surface of the rear manifold portion abutting against the front surface of the melt distribution manifold, each nozzle portion having a conical front surface extending to a pointed tip mounted in alignment with an injection gate, each of the single piece nozzle manifolds having a melt channel extending therethrough from an inlet on the rear surface to receive pressurized melt from the melt passage in the melt distribution manifold, the melt channel branching in the rear manifold portion into a plurality of branches, a respective one of the branches extending to an outlet on the conical surface of each of the nozzle portions.

2. An injection molding apparatus as claimed in claim 1 wherein the rear manifold portion of each single piece nozzle manifold has a plurality of threaded holes to receive screw means to allow secure attachment of each single piece nozzle manifold to the melt distribution manifold.

3. An injection molding apparatus as claimed in claim 2 wherein the branches of the melt channel of each single piece nozzle manifold extend diagonally outwardly and frontwardly from the inlet on the rear surface of the rear manifold portion.

4. An injection molding apparatus as claimed in claim 3 wherein the cross-section of the rear manifold portion of each single piece nozzle manifold is square.

5. An injection molding apparatus as claimed in claim 4 wherein each single piece nozzle manifold has four equally spaced identical nozzle portions, each of the nozzle portions extending frontwardly from a different quadrant of the rear manifold portion.

* * * * *